(12) United States Patent
Rathweg et al.

(10) Patent No.: US 7,405,901 B2
(45) Date of Patent: Jul. 29, 2008

(54) TAPE DRIVE SENSOR SYSTEM

(75) Inventors: Christopher Rathweg, Louisville, CO (US); Stephen J. Stamm, Ft. Lupton, CO (US)

(73) Assignee: Quantum Corporation, San Jose, CA (US)

(*) Notice: Subject to any disclaimer, the term of this patent is extended or adjusted under 35 U.S.C. 154(b) by 388 days.

(21) Appl. No.: 10/829,311

(22) Filed: Apr. 20, 2004

(65) Prior Publication Data

US 2005/0231847 A1 Oct. 20, 2005

(51) Int. Cl.
*G11B 15/675* (2006.01)
(52) U.S. Cl. .................... 360/94; 360/96.51
(58) Field of Classification Search ............ 360/96.5, 360/94, 96.51
See application file for complete search history.

(56) References Cited

U.S. PATENT DOCUMENTS

| 5,025,334 | A | | 6/1991 | Perona et al. |
| 5,032,939 | A | * | 7/1991 | Mihara et al. ............. 360/96.5 |
| 5,067,036 | A | * | 11/1991 | Ozawa ....................... 360/96.5 |
| 5,239,427 | A | * | 8/1993 | Ooka et al. ................ 360/96.5 |
| 5,390,057 | A | * | 2/1995 | Nishimura et al. ........ 360/96.5 |
| 6,292,452 | B1 | | 9/2001 | Endo et al. |

* cited by examiner

*Primary Examiner*—Craig A Renner
(74) *Attorney, Agent, or Firm*—Morrison & Foerster LLP (57) ABSTRACT

A data drive for detecting loading/unloading positions and media type is provided. The drive includes: a drive base; a receiver for receiving a storage media device, the receiver being movably coupled to the drive base and translatable from an unloaded position to a loaded position; a media flag, for detecting a media type of the storage media device, movably coupled to the receiver and translatable from a first position to a second position when the storage media device is inserted into the receiver; a media flag sensor fixedly coupled to the drive base for detecting movement of the media flag; a receiver flag, for detecting position of the storage media device, fixedly coupled to the receiver; and a receiver flag sensor fixedly coupled to the drive base for detecting movement of the receiver flag.

9 Claims, 10 Drawing Sheets

TAPE DRIVE SENSOR SYSTEM

BACKGROUND OF THE INVENTION

Storage subsystems, such as magnetic tape libraries, are widely used for storing information in digital form. These tape subsystems may include a storage subsystem controller for controlling one or more tape drives contained within the storage subsystem and for controlling other components of the storage subsystem, such as the tape picker, which is used to select and load tape cartridges into the tape drives. The storage subsystem may be coupled to a host system which transmits I/O requests to the storage subsystem via a host/storage connection.

Each tape drive reads and writes data to the primary storage medium, which can be, for example, a magnetic tape medium contained within a removable storage media device, such as, e.g., a removable magnetic tape cartridge or cassette. The magnetic tape medium typically comprises a thin film of magnetic material which stores the data. The tape medium may be moved by the tape drive between a pair of spaced apart reels and past a data transducer to record or read back information. In one type of tape drive system, one of the reels is part of the tape drive while the other reel is part of the removable tape cartridge. For this type of tape drive system, the reel which is a part of the tape drive is commonly referred to as a take-up reel, while the reel which is a part of the tape cartridge is commonly referred to as a cartridge reel. In another type of tape drive system, both reels are contained in a removable tape cassette.

Various methods have been used for loading a tape cartridge into a tape drive. In some automated loading systems, the tape cartridge is inserted into the tape drive by, for example, a robotic picker mechanism. The picker arm is typically configured to apply a force to the back of the tape cartridge to fully insert the tape cartridge into the tape drive. Upon insertion of the tape cartridge into the tape drive, a reel driver gear having a set of teeth matching a set of gear teeth provided on the bottom of the cartridge reel rises to couple with cartridge reel in the tape cartridge. A take-up reel of the tape drive is coupled to the cartridge leader on the magnetic tape and draws the magnetic tape out of the tape drive, past the data transducer, and onto the take-up reel. In this type of manual loading system, the tape cartridge travels in a single plane during the loading process. The picker mechanism provides the insertion force in a horizontal direction to drive the front of the cartridge to the location where the take-up leader coupling is to occur. Once the tape cartridge is firmly seated in the tape drive, the reel driver in the tape drive rises in the vertical direction (orthogonal to the horizontal insertion direction) to couple with the cartridge reel.

In other systems, sometimes referred to as "soft load" systems, the tape cartridge is placed in an initial loading location by the picker mechanism or by a human operator. The tape drive then assumes control of the tape cartridge and repositions the tape cartridge into the fully loaded location. This positioning typically involves translating the tape cartridge first in the horizontal direction and then in the vertical direction until a stationary reel driver in the tape drive couples with the cartridge reel. Soft, load systems can enable the tape drive to more accurately locate the tape cartridge in the final loaded positioning, free from the effects of a manual human load or library robotics variations.

Existing tape drive architectures may use sensors of different types to detect different conditions existing in the drive. These sensors, however, operate according to a one-to-one relationship between the condition a sensor is designed to detect and the sensor itself. For instance, a first sensor may be used to detect when a cartridge is present in a drive, while a second sensor may be used to determine the type of cartridge that is present, while a third sensor may be used to determine if the cartridge is in a position in the drive such that a load operation may be initiated. Unfortunately, as the number of sensors utilized in a given drive increases, the cost and complexity of the drive typically increases as well. Accordingly, it may be desirable to provide a tape drive architecture with sufficient ability to detect relevant conditions during operation while decreasing the overall cost and complexity of the drive.

BRIEF SUMMARY OF THE INVENTION

In accordance with embodiments of the present invention, a data drive is described. The drive comprises: a drive base; a receiver for receiving a storage media device, the receiver being movably coupled to the drive base and translatable from an unloaded position to a loaded position; a media flag movably coupled to the receiver and translatable from a first position to a second position when the storage media device is inserted into the receiver; a media flag sensor fixedly coupled to the drive base for detecting movement of the receiver flag; a receiver flag fixedly coupled to the receiver; and a receiver flag sensor fixedly coupled to the drive base for detecting movement of the receiver flag.

In accordance with embodiments of the present invention, a method of operating a data drive is described. The method comprises: receiving a storage media device into a receiver such that the storage media device contacts a media flag movably coupled to the receiver; detecting movement of the media flag using a media flag sensor; actuating movement of the receiver from an unloaded position to a loaded position; and detecting movement of a receiver flag fixedly coupled to the receiver using a receiver flag sensor.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

DETAILED DESCRIPTION OF THE INVENTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Some portions of the detailed description which follows are presented in terms of procedures, steps, logic blocks, processing, and other symbolic representations of operations on data bits that can be performed on computer memory. A procedure, computer executed step, logic block, process, etc., are here conceived to be a self-consistent sequence of steps or instructions leading to a desired result. The steps are those utilizing physical manipulations of physical quantities. These quantities can take the form of electrical or magnetic signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1:
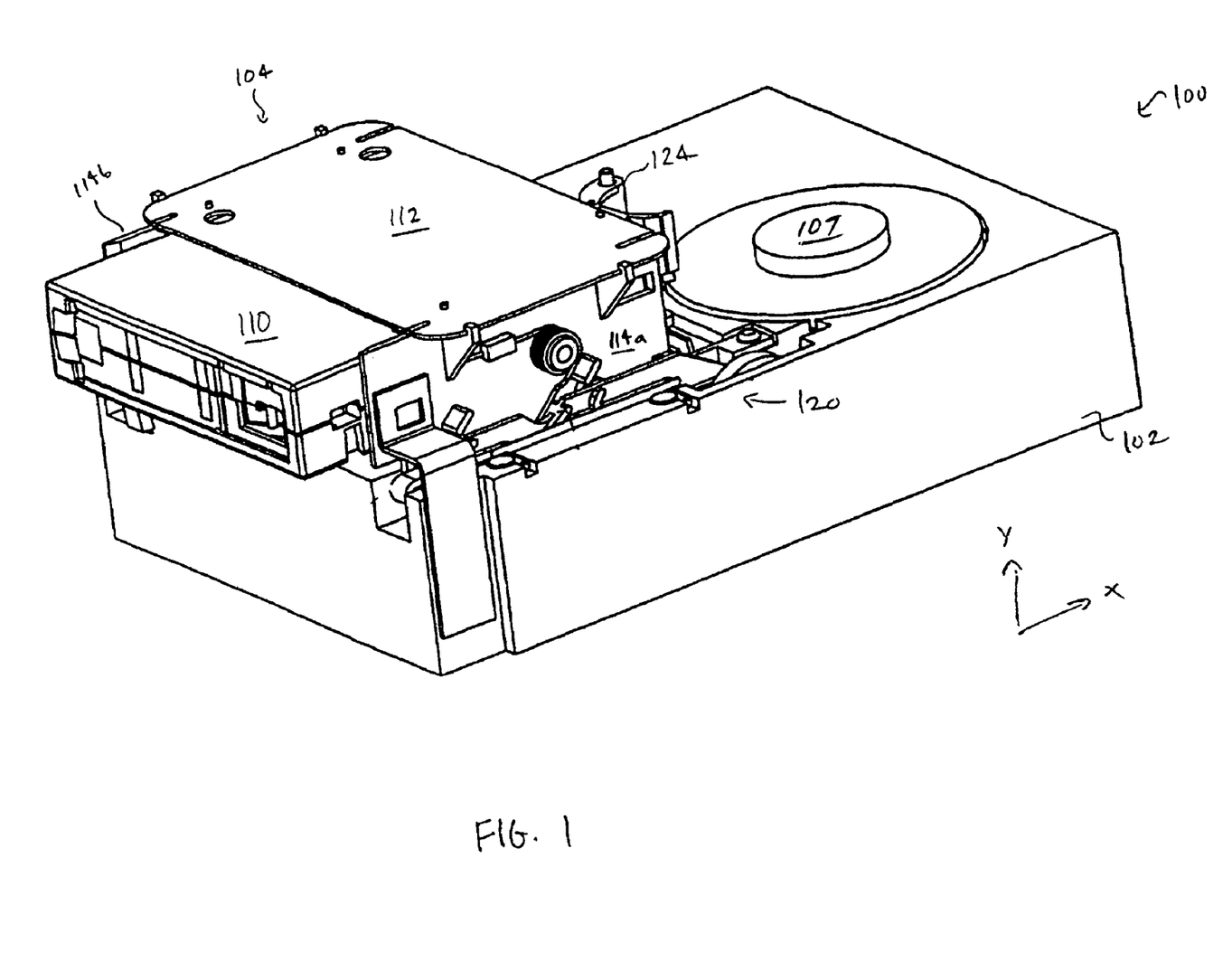
FIG. 1 shows in perspective view a tape drive system in accordance with embodiments of the present invention.

FIG. 1 shows in perspective view a tape drive system 100 in accordance with embodiments of the present invention. The tape drive system 100 comprises a stationary tape drive body 102, a moving receiver 104 for receiving and translating a storage media device (shown as a tape cartridge 110), and a take-up reel 107. The receiver 104 comprises a top plate 112 and two opposing side walls 114a-114b. During operation, a robotic picker mechanism or a human operator inserts the tape cartridge 110 into the receiver 104 and applies a force onto the back of the cartridge 110, thereby driving the cartridge 110 in the forward direction (shown as the positive x-direction in FIG. 1) deeper into the receiver 104.

As used herein, the terms "horizontal" and "vertical" refer to relative directions based upon the orientation of the tape cartridge 110 when the tape cartridge 110 is fully loaded into the tape drive system 100. The "vertical" direction is defined as the direction of the axis of rotation of the cartridge reel in the tape cartridge 110, while the "horizontal" direction is orthogonal to the "vertical" direction As shown in FIG. 1, the "horizontal" direction is indicated by the x-axis and the "vertical" direction is indicated by the y-axis. It will be understood that in some storage systems, the tape drive 100 may be mounted on its side such that the "vertical" direction as defined herein by the axis of the cartridge reel 107 is parallel to the horizon (i.e., the tape cartridge 110 is inserted into the tape drive 100 such that the thin side of the tape cartridge 110 is parallel to the floor of the room in which the storage system is provided). In addition, the term "forward" is used herein to refer to the direction of travel which the tape cartridge 110 follows in the horizontal direction when being loaded into the tape drive 100. Similarly, the term "rearward" refers to the horizontal direction of travel of the tape cartridge 110 during ejection (i.e., the direction opposite the "forward" direction).

In FIG. 1, the receiver 104 and the tape cartridge 110 are shown in the initial load (or ejected) position. After the cartridge 110 is fully inserted into the receiver 104, a loading mechanism 120 translates the receiver 104 first horizontally in the forward direction to position the reel 116 (shown in FIG. 8) of the tape cartridge 110 directly above a stationary reel driver in the tape drive system 100. Then, the loading mechanism 120 translates the receiver 104 downward in the vertical direction to mate the reel 116 with the reel driver.

After the tape cartridge 110 is fully loaded into the tape drive 100, a buckler assembly 124 couples a buckle provided at the end of the magnetic tape medium with a take-up leader. An exemplary tape drive system 100 which can be used in accordance with embodiments of the present invention is described in U.S. patent application "TAPE CARTRIDGE SOFT LOAD SYSTEM," having Ser. No. 10/656,656, filed Sep. 4, 2003, the disclosure of which is incorporated by reference herein in its entirety. Other types of tape drive systems with different components and operation may be used in accordance with various embodiments of the present invention.

Figure 2:
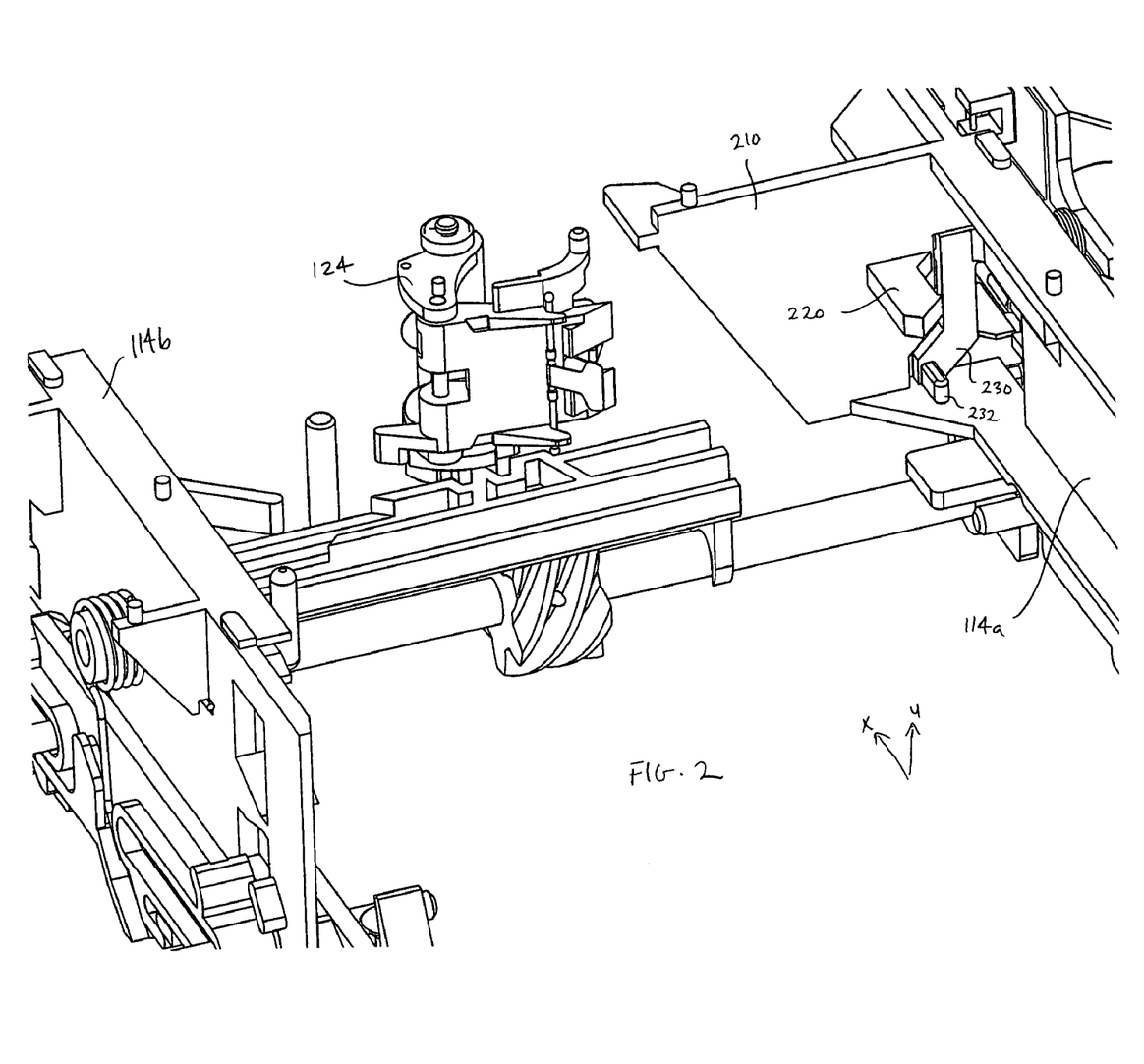
FIG. 2 shows in perspective view the front portion of the receiver with the top plate and other drive structures removed for clarity.

FIG. 2 shows in perspective view the front portion of the receiver 104 with the top plate 112 and other drive structures removed for clarity. At the front of the receiver 104 a front wall 210 is provided for limiting forward movement of the cartridge 110 once the cartridge 110 has been fully inserted into the receiver 104. A brake release pin 220 is provided on the front wall 210 for releasing a reel brake contained within the cartridge 110. A media flag 230 is coupled to the receiver 104 and is configured to trigger a media flag sensor 310 (shown in FIGS. 3A-3B) when a cartridge 110 is inserted into the receiver 104. The media flag 230 includes a finger 232, which protrudes into the interior region of the receiver 104 such that the finger 232 is depressed when an appropriate cartridge 110 is inserted, as will be described in greater detail below. As used herein, a flag comprises any member that is movable between at least two different positions such that the presence of the flag is detectable by a sensor.

Figure 3A:
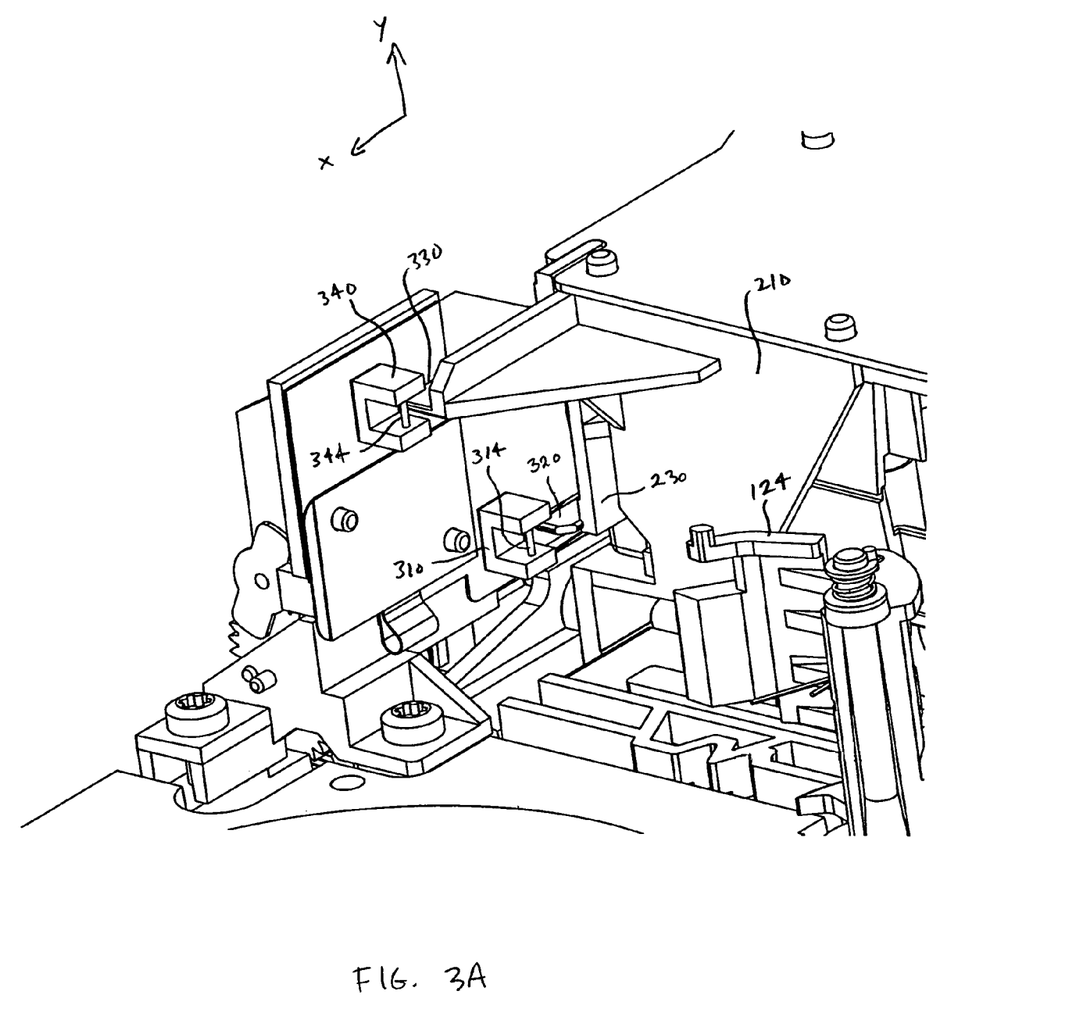
FIGS. 3A-3B are perspective views of a portion of a tape drive system in accordance with embodiments of the present invention.
Figure 3B:
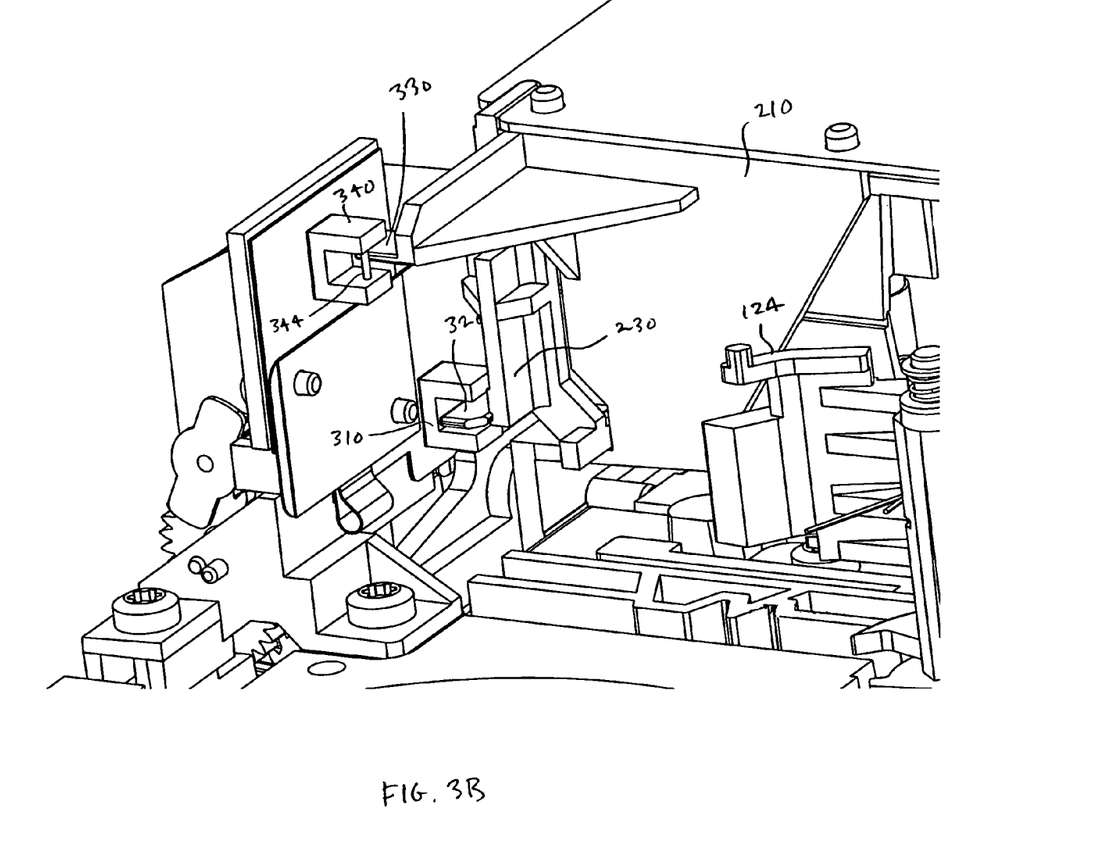

FIGS. 3A-3B are perspective views of the front side 111 of the front wall 210, opposite the view shown in FIG. 2. It can be seen here that the media flag 230 includes a tongue 320 that extends beyond the front wall 210 and is aligned with the media flag sensor 310 such that when the finger 232 is depressed by a cartridge 110 inserted into the receiver 104, the media flag 230 is pushed forward causing the tongue 320 to trigger the media flag sensor 310 (as shown in FIG. 3B).

FIGS. 3A-3B also show a receiver flag 330 that projects out of the front side of the front wall 210. This flag 330 is positioned adjacent to and aligned with the receiver flag sensor 340 such that as the receiver 104 travels in the forward direction, the receiver flag 330 triggers the receiver flag sensor 340.

In the embodiments shown in the figures and described herein, the media flag sensor 310 and receiver flag sensor 340 are bi-state sensors. These bi-state sensors are configured to detect a single condition and only output a signal corresponding to whether or not that condition exists. The exemplary bi-state sensor 310 illustrated in FIGS. 3A-3B comprises a light-emitting diode (LED) and an optical detector positioned to detect the light beam 314 emitted by the LED. (Although the light beam 314 and the light beam 344 detected by the receiver flag sensor 340 are shown for illustrative purposes in FIG. 3A, it will be understood that these beams 314, 344 may or may not be visible by the human eye during normal operation.) When the receiver 104 is empty, the media flag 230 is maintained in the rearward position shown in FIGS. 2 and 3A by a spring 312 (shown in FIG. 4A). When the media flag 230 is in this position, the detector is in its first state in which it detects the light from the LED. When the media flag 230 is moved forward by an inserted cartridge 110 (as shown in FIG. 3B), the tongue 320 passes between the LED and the detector, thereby blocking the detector from detecting the light from the LED. This triggers the media flag sensor 310 into its second state. In other embodiments, different types of sensors may be used. Bi-state sensors may be desirable because they are relatively simple and inexpensive. However, in other embodiments, sensors capable of detecting multiple states or of monitoring gradually changing conditions may be utilized.

In accordance with embodiments of the present invention, the above-described tape drive system 100 can be used to detect various conditions existing in the drive. In particular, the bi-state signals received from the media flag sensor 310 and the receiver flag sensor 340 may be used in combination to detect one or more of the following conditions:

1. Detect the insertion of a cartridge type unsupported by the drive.
2. Detect the type of cartridge inserted into the drive from a plurality of supported cartridge types.
3. Detect when to begin a loading operation.
4. Detect that a cartridge is located in the receiver even after the drive has ejected the cartridge from the drive.
5. Detect that a cartridge was removed from the receiver after it is ejected from the drive.

Figure 7A:
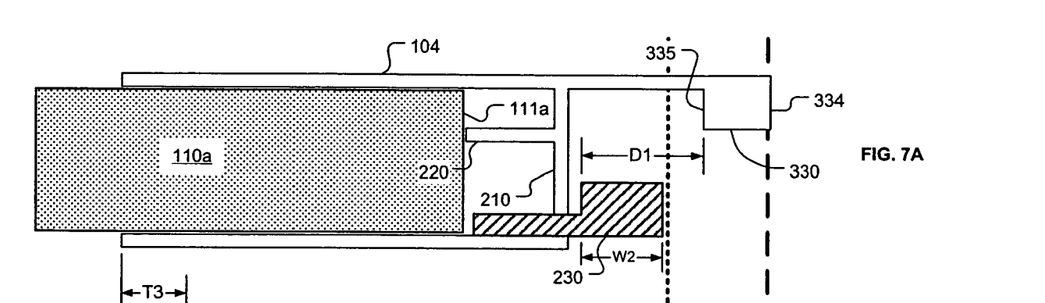
Figure 7B:
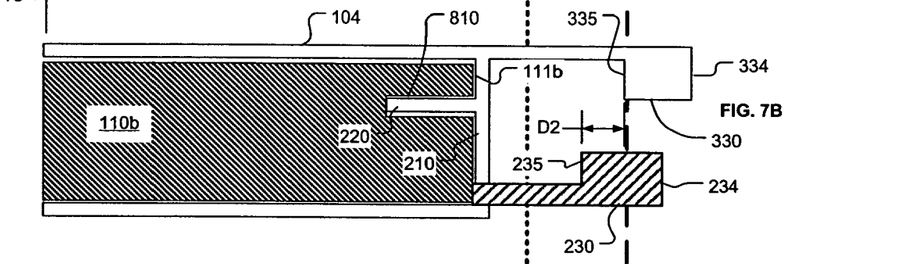
Figure 7C:
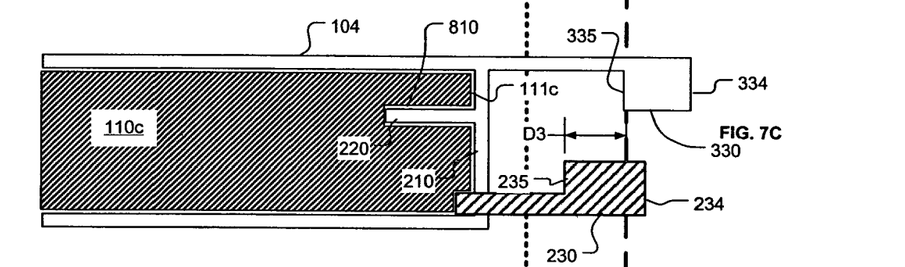
Figure 7D:
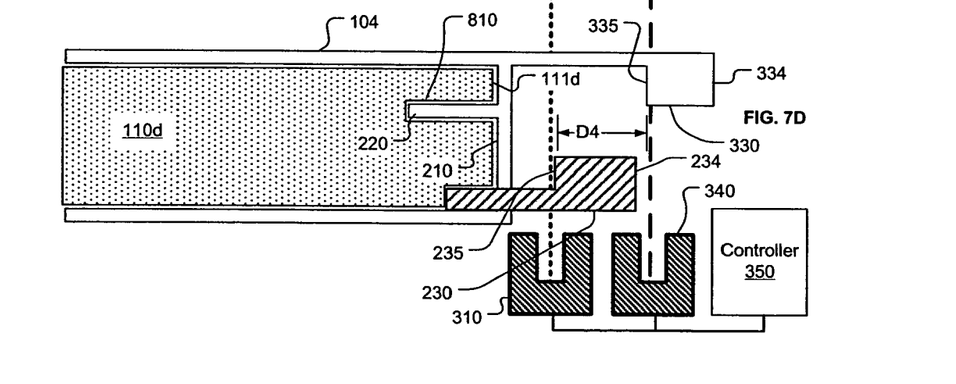
Figure 8:
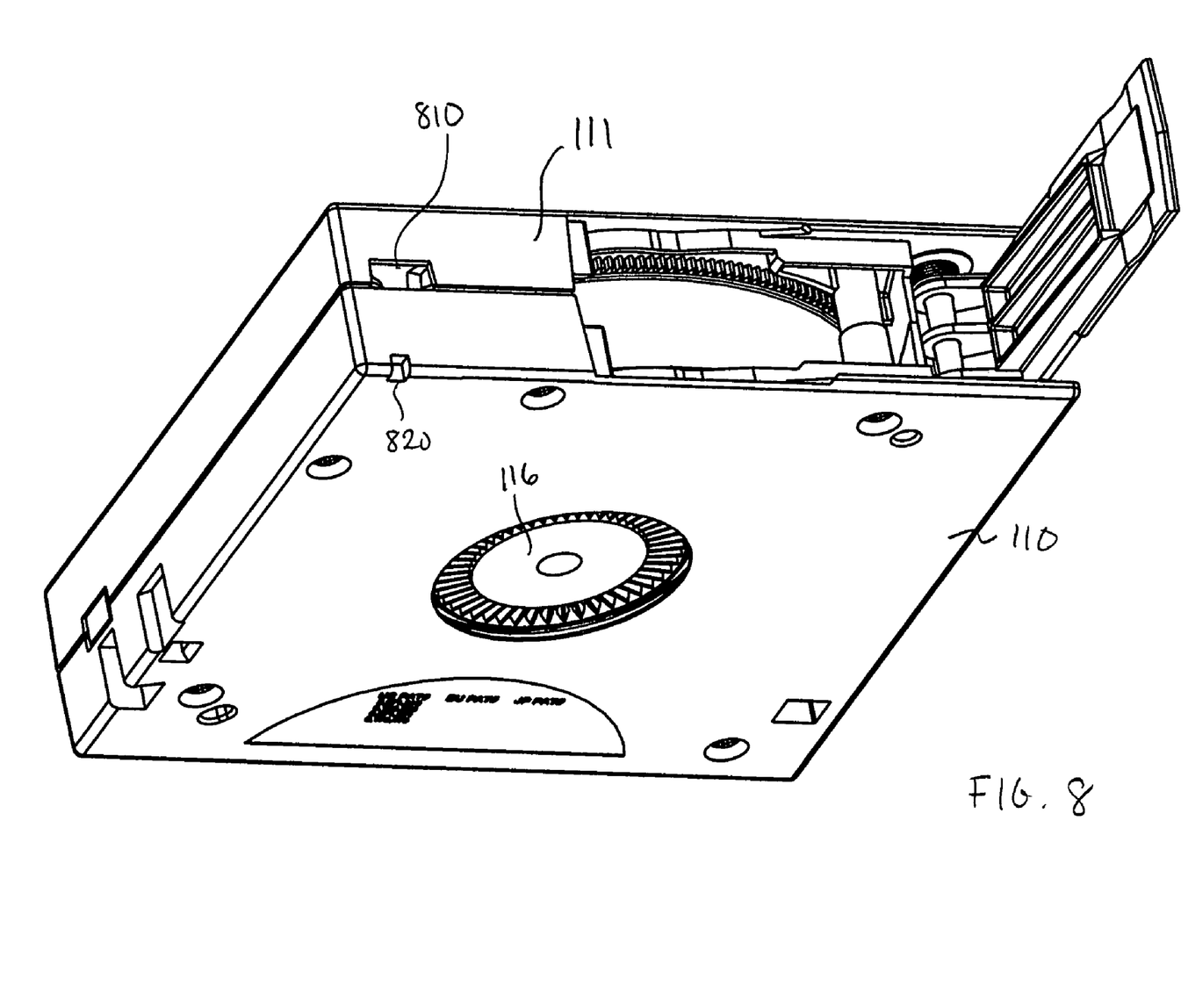
FIG. 8 is a perspective view of a tape cartridge that can be loaded into a tape drive system in accordance with embodiments of the present invention.

FIGS. 4-7 are simplified block diagrams showing the operation of the tape drive system 100, in accordance with embodiments of the present invention. In FIGS. 4A-4D, the position of the receiver 104 and the media flag 320 are shown in the state at which the cartridge 110 is first inserted into the receiver 104. In FIG. 4A, a cartridge 110a of a type That is incompatible with the tape drive system 100 is inserted into the receiver 104. In this embodiment, cartridges that are compatible with the tape drive system 100 include a brake release opening 810, as shown in FIG. 8. When a compatible cartridge 110 is inserted into the drive system 100, the brake release pin 220 is received into the brake release opening 810 where it disengages a reel lock contained within the cartridge 110.

Figure 4A:
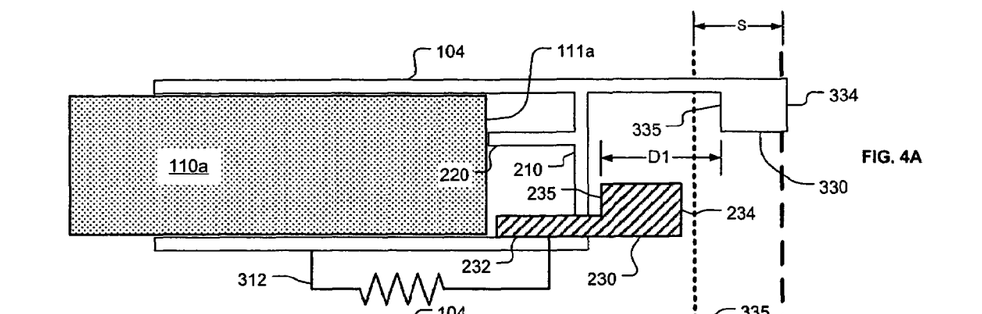
FIGS. 4-7 are simplified block diagrams showing the operation of the tape drive system in accordance with embodiments of the present invention.

In FIG. 4A, the incompatible cartridge 110a does not include a brake release opening 810 that is positioned to correspond with the brake release pin 220. This cartridge 110a may be, for example, a cartridge conforming to the Linear Tape-Open (LTO) standard. Accordingly, the brake release pin 220 abuts the front side 111 of the cartridge 110a and prevents the cartridge 110a from being fully inserted into the receiver 104. As a result, the cartridge 110a does not contact the finger 232 of the media flag 230.

Figure 5A:
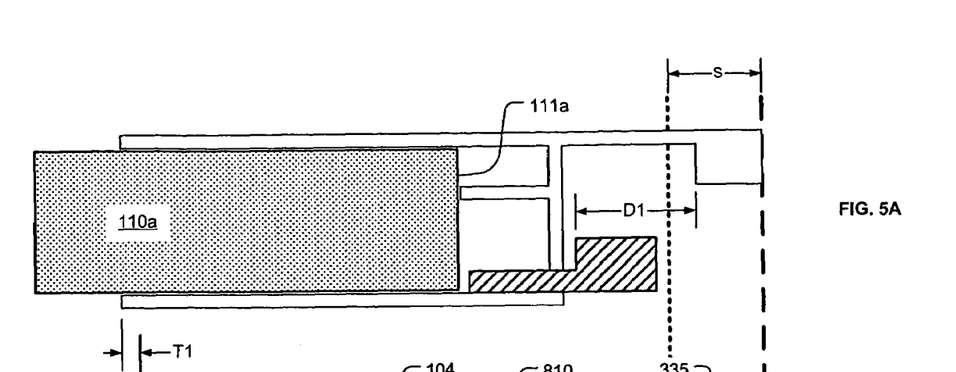
Figure 6A:
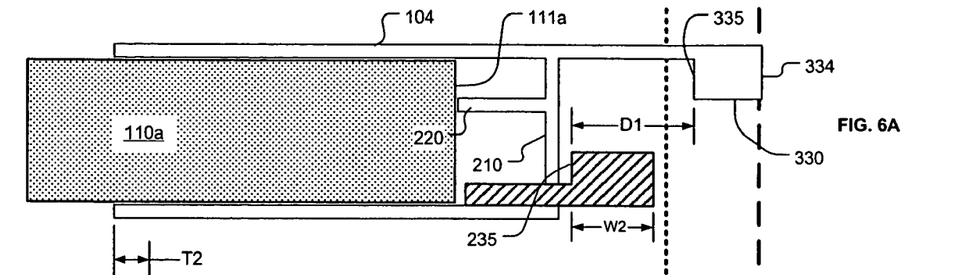
Figure 6B:
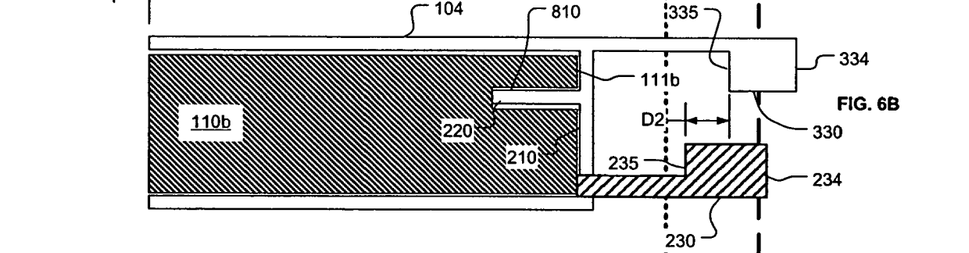

As the tape cartridge 110 is first inserted into the receiver 104 in FIG. 4A, the distance D1, is the initial distance between the trailing edge 235 of the media flag 230 and the trailing edge of 335 of the receiver flag 330. Similar to FIG. 4A, D1 is shown in FIGS. 5A, 6A, and 7A. When the cartridge 110a is being inserted into the receiver 104, a forward-driving force is applied to the cartridge 110a, typically by a robotic picker mechanism or by a human operator. Once the cartridge 110a contacts the brake release pin 220, continued forward-driving force upon the cartridge 110a causes the receiver 104 to move with the cartridge 110a in the forward direction. This forward movement of the receiver 104 causes the receiver flag 330 to move forward such that a leading edge of the receiver flag 330 triggers the receiver flag sensor 340. The receiver flag sensor 340, in turn, transmits a signal to a controller 350 in the tape drive system 100 indicating that the receiver flag 330 has been detected. Normally, this signal would indicate to the tape drive system 100 that a cartridge has been fully inserted into the receiver 104 and that a cartridge load process should be initiated. However, in this case, because the cartridge 110a was prevented from being fully inserted into the receiver 104, the media flag sensor 310 has not transmitted a signal to the controller 350 indicating that the media flag 230 has been detected. Therefore, the controller 350 can conclude that the cartridge 110a which has been inserted into the receiver 104 is of an incompatible type and will proceed with initiating an error sequence. This error sequence can include, for example, sending a signal to a library controller or robotic picker controller indicating that the cartridge 110a is improper and should be removed. In another embodiment, the controller 350 may cause an error message to be displayed to a human operator using, for example, an indicator light or a message on a computer terminal display. This error message can instruct the operator to remove the cartridge 110a from the receiver 104. Thus, the signals from the media flag sensor 310 and the receiver flag sensor 340 can be used in conjunction to enable the tape drive system 100 to determine when an improper cartridge 110a has been inserted and to take the appropriate steps to remedy the situation by stopping the cartridge loading process and having the cartridge 110a removed.

Figure 4B:
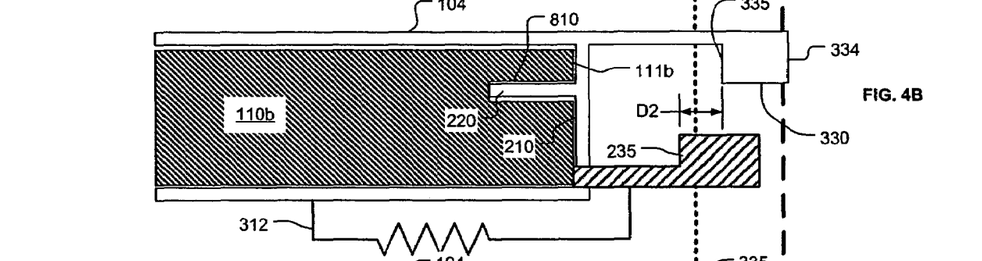
Figure 4C:
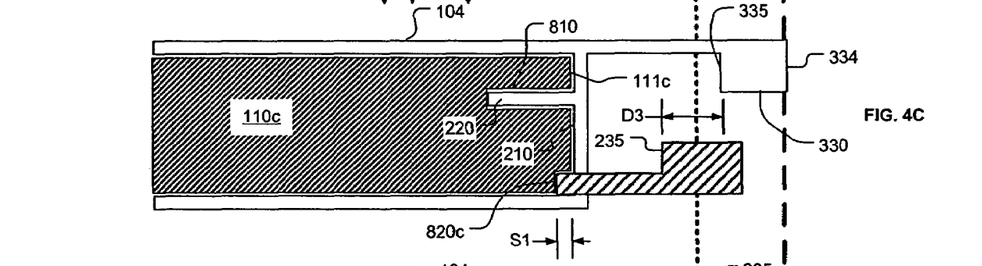
Figure 4D:
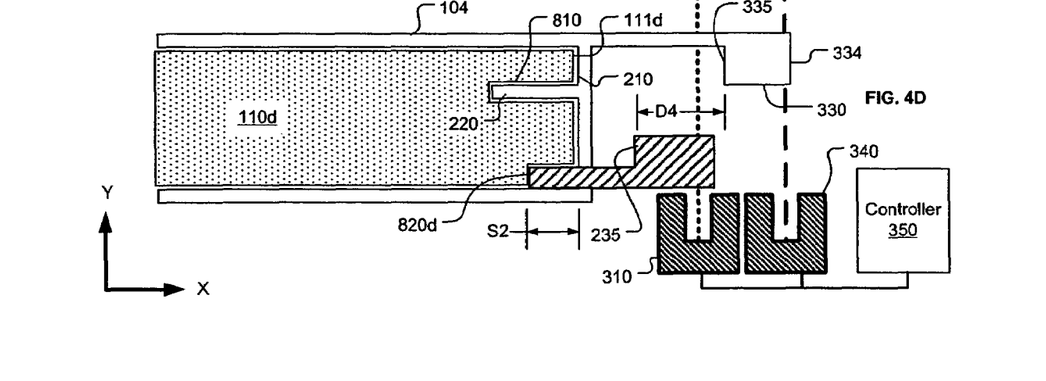

FIGS. 4B-4D show simplified block diagrams of three different types of valid storage media devices 110b-110d being inserted into the receiver 104. In this case, all three types of cartridges 110b-110d are supported by the tape drive system 100 but may have different loading requirements. Therefore, it may be desirable for the tape drive system 100 to identify the type of cartridge upon insertion so that the proper loading sequence can be initiated.

In FIG. 4B, the cartridge 110b includes a brake release opening 810 but does not include an indicator slot 820 (shown in FIG. 8), indicating that the cartridge 110b is of a first acceptable cartridge type. This cartridge 110b may be, for example, a cartridge conforming to a Digital Linear Tape (DLT) standard. As the cartridge 110b is inserted into the receiver 104, the brake release pin 220 is fully received into the brake release opening 810, thereby releasing the reel lock contained within the cartridge 110b, and enabling the front side 111 of the cartridge 110b to contact the front wall 210 of the receiver 104. At the same time, because the cartridge 110b does not include an indicator slot 820, the front side 111b of the cartridge 110b contacts the finger 232 of the media flag 230 and causes the media flag 230 to move forward and trigger the media flag sensor 310, as shown in FIG. 4B.

After the cartridge 110b reaches the front wall 210 of the receiver 104, continued force in the forward direction applied by the picker mechanism or human operator causes the receiver 104 to move slightly in the forward direction, which, in turn, causes the receiver flag 330 to trigger the receiver flag sensor 340. In the situation shown in FIG. 4A, the media flag sensor 310 is not triggered by the media flag 230 when the receiver flag sensor 340 is triggered. In contrast, in FIG. 4B, when the receiver flag sensor 340 is triggered, the media flag sensor 310 will have already detected the media flag 230. When the controller 350 receives signals indicating that the receiver flag 330 had been detected prior to the detection of the media flag 230, the controller 350 will recognize that a valid cartridge 110b has been inserted and the loading process should be initiated.

FIG. 4C illustrates a situation similar to the one shown in FIG. 4B, except in FIG. 4C, the cartridge 110c is of a type that contains a small indicator slot 820c having a depth SI. In this case, the finger 232 of the media flag 230 will be received into the indicator slot 820c so that the leading edge of the media flag 230 will not be extended out as far as the media flag 230 shown in FIG. 4B. However, the media flag 230 will extend sufficiently far to be detected by the media flag sensor 310, thereby indicating to the controller 350 that a valid cartridge 110c has been inserted and the loading process should be initiated.

FIG. 4D illustrates a situation similar to the one shown in FIG. 4C, except in FIG. 4D, the indicator slot 820d in the cartridge 110d has a depth S2, which is deeper than the depth S1 of the indicator slot 820c in cartridge 110c. Thus, the finger 232 of the media flag 230 will be received deeper into the indicator slot 820d and the media flag 230 will not extend as far as the media flag 230 in FIG. 4C. The media flag 231 will extend sufficiently far to be detected by the media flag sensor 310, thereby indicating to the controller 350 that a valid cartridge 110d has been inserted and the loading process should be initiated. In one embodiment, a first type of tape cartridge 110c, with front side 111c, has an indicator slot 820c having a depth S1 of approximately 0.10" and a second type of tape cartridge 110d, with front side 111d, has an indicator slot 820d having a depth S2 of approximately 0.18".

The depth S2 of the indicator slot 820d may be selected by the cartridge manufacturer to designate the type of the cartridge and to enable tape drive systems 100 to distinguish the cartridge 110d from the cartridge 110c. Similarly, the presence of an indicator slot 820c or 820d distinguishes the cartridges 110c and 110d from the cartridge 110b shown in FIG. 4B, which may have been designed before the implementation of the indicator slot conventions. A tape manufacturer may begin incorporating specified indicator slot sizing and positioning in order to make tape drive systems 100 backward compatible with older tape cartridge designs, while enabling the tape drive systems 100 to take advantage of newly-developed technology in next generation tape cartridges 110. The indicator slot provides a mechanism for the tape drive system 100 to identify the type of tape cartridge 110 that is inserted and to operate in accordance with the design of that particular tape cartridge 110. This may be useful, for example, if the new type of tape cartridge utilizes a different type of tape leader which requires a different type of buckler assembly or buckling procedure. The tape drive system 100 may be configured to identify the type of cartridge and to select the appropriate buckling procedure to use to couple the tape leader with the take-up reel.

In all of the situations illustrated in FIGS. 4B-4D, the controller receives signals from both the media flag sensor 310 and the receiver flag sensor 340 indicating that the media flag 230 and the receiver flag 330 have been extended sufficiently far that both the sensors 310 and 340 have been triggered. Therefore, the controller 350 recognizes that a valid cartridge 110 has been inserted and loading should begin. However, because the media flag sensor 310 is only a bi-state sensor, the sensor 310 can only indicate whether the media flag 230 is present or not present and cannot independently determine how far the media flag 230 extends. Therefore, the media flag sensor 310 cannot be independently used to determine which cartridge type (cartridge 110b, cartridge 110c, or cartridge 110d) has been inserted into the receiver 104. A further process may be utilized in order to determine the cartridge type using the media flag sensor 310 in conjunction with the receiver flag sensor 340. The process used may vary depending on the number of different cartridge types between which the tape drive system 100 is desired to distinguish.

In some embodiments, the tape drive system 100 is configured to distinguish between three or more different types of tape cartridges based on the varying depths of the indicator slots 820 or the absence of an indicator slot 820. Because the receiver flag 330 has a fixed position relative to the moving receiver 104 and the media flag 230 has a variable position relative to the moving receiver 104 depending on the depth of the indicator slot 820, the cartridge type determination may be accomplished by determining the relative distance between the media flag 230 and the receiver flag 330. This may be accomplished, for example, by translating the receiver 104 and monitoring when the media flag 230 and receiver flag 330 cease to trigger their respective sensors 310, 340, as will be described in greater detail below.

As can be seen in FIGS. 4B-4D, after the cartridges 110b-110d are initially loaded into the receiver 104, both the media flag 230 and the receiver flag 330 are positioned such that they are detected by the media flag sensor 310 and receiver flag sensor 340, respectively. As a result, both sensors 310, 340 are transmitting signals to the controller 350 indicating that they detect the presence of the flags 230, 330. As illustrated in FIGS. 6A and 7A, the distance between the trailing edge 235 and leading edge 234 of media flag 230 is W2. In the situations shown in FIGS. 4B-4D, the media flag 230 is separated from the receiver flag 330 by a unique and predetermined distance corresponding to the depth of the indicator slots 820c-820d or the lack thereof (as in FIG. 4B). For example, in FIG. 4B, the trailing edge 235 of the media flag 230 is separated from the trailing edge 335 of the receiver flag 330 by a distance D2, which is known to correspond to the cartridge type for cartridge 110b. In FIG. 4C, the trailing edge 235 of the media flag 230 is separated from the trailing edge 335 of the receiver flag 330 by a distance D3, which is known to correspond to the cartridge type for cartridge 110c, and in FIG. 4D, the trailing edge 235 of the media flag 230 is separated from the trailing edge 335 of the receiver flag 330 by a distance D4, which is known to correspond to the cartridge type for cartridge 110d.

The media flag sensor 310 and the receiver flag sensor 340 can be used to determine these distances D2-D4 using the following exemplary process. FIGS. 4B-4D show the position of the receiver 104 and the state of the media flag 230 and the receiver flag 330 immediately after the cartridges 110b-110d have been fully inserted. The picker mechanism will have pushed the receiver 104 far enough that the presence of the receiver flag 330 is detected by the receiver flag sensor 340. After the controller 350 determines that a load request has been made (as indicated by the detection of the receiver flag 330) and that the cartridge 110 in the receiver is of a valid type (as indicated by the detection of the media flag 230), the controller 350 instructs the loading mechanism 120 to begin the loading of the receiver 104.

Figure 5B:
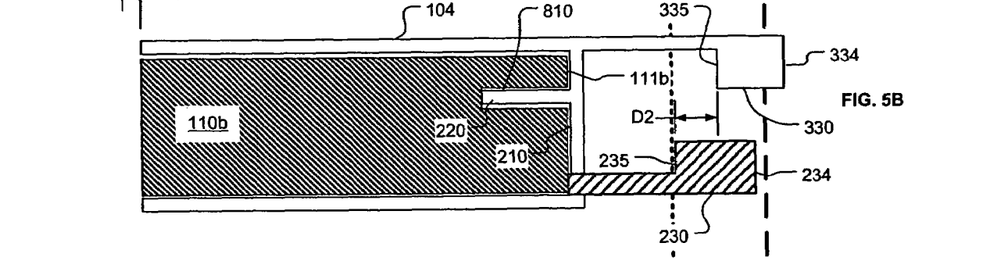

In the illustrated embodiment, the loading process begins by translating the receiver 104 in the forward direction. FIG. 5B illustrates the state of the media flag 230 and receiver flag 330 after the receiver 104 and cartridge 110b has been translated a distance T1. Similarly, illustrated in FIG. 6B, the cartridge 110b is translated a distance T2. Also, illustrated in FIG. 7B, the cartridge 110b is translated a distance T3. At this point, the trailing edge 235 of the media flag 230 in FIG. 5B has passed beyond the media flag sensor 310, so the controller 350 will receive a signal from the media flag sensor 310 indicating that the media flag 230 is no longer detected. The loading mechanism 120 will continue to translate the receiver 104 forward until the trailing edge 335 of the receiver flag 330 passes beyond the receiver flag sensor 340. The controller 350 may also be configured to monitor the movement of the receiver 104 using, for example, a tachometer connected to a motor (e.g., a DC motor or a stepper motor) driving the loading mechanism 120. Thus, the controller 350 can determine the distance the receiver 104 travels between the moment that the media flag 230 ceases to be detected and the moment that the receiver flag 330 ceases to be detected. By taking the known distance between the media flag sensor 310 and the receiver flag sensor 340 (shown as distance S) and subtracting this monitored distance of travel of the receiver 104, the distance D2 can be determined. This distance D2 is the distance between the trailing edge 235 of the media flag 230 and the trailing edge of 335 of the receiver flag 330. The controller 350 can be programmed to correlate the distance D2 with the cartridge type of cartridge 110b, and thereby identify the type of cartridge that has been inserted into the receiver 104.

Figure 5C:
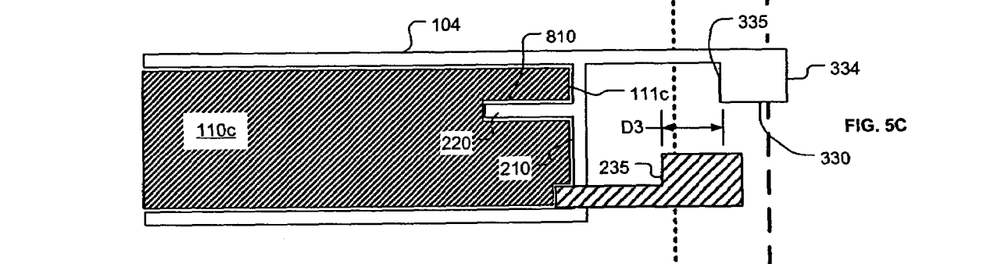
Figure 5D:
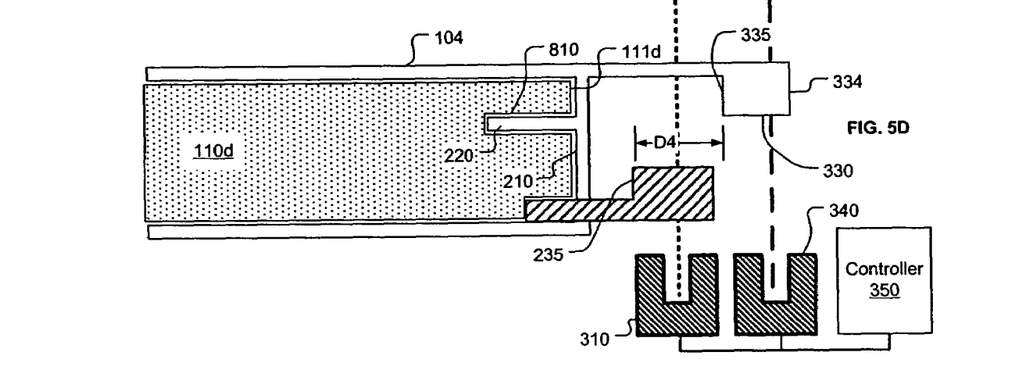
Figure 6C:
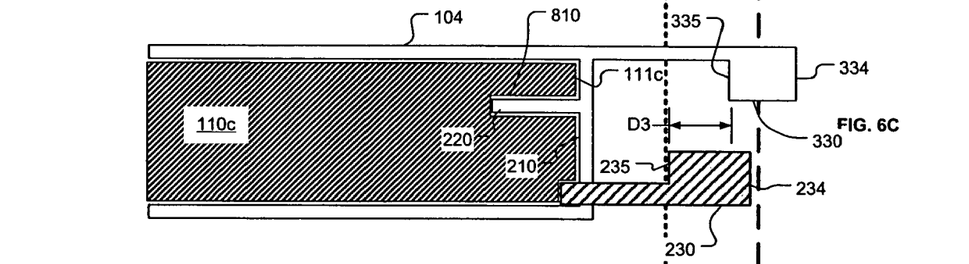
Figure 6D:
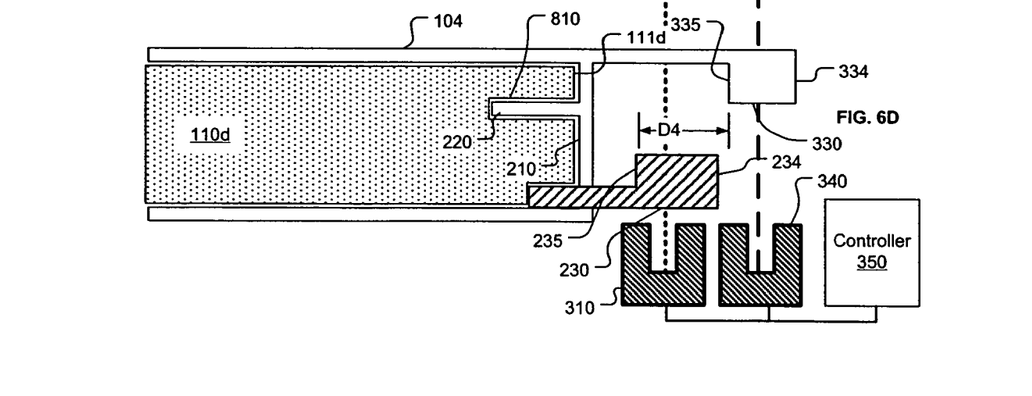

In the state of cartridge 110c illustrated in FIG. 5C where the receiver 104 has traveled a distance of T1, the trailing edge 235 of the media flag 230 has not yet passed the media flag sensor 310. Therefore, the loading mechanism 120 will continue to translate the receiver 104 in the forward direction. After the receiver 104 has traveled a distance of T2 (as shown in FIG. 6C), the media flag 230 will no longer be detected by the media flag sensor 310. At this point, the controller 350 will monitor the forward movement of the receiver 104 between the moment that the trailing edge 235 of the media flag 230 ceases to be detected and the moment that the receiver flag 330 ceases to be detected. As described above with respect to FIGS. 4B and 5B, the distance traveled between these two events can be used in conjunction with the known distance S between the sensors 310, 340 to calculate the distance D3. As above, the controller 350 can be programmed to correlate the distance D3 with the cartridge type of cartridge 110c, and thereby identify the type of cartridge that has been inserted into the receiver 104.

A similar process can be used to determine the distance D4, as shown in FIGS. 4D, 5D, 6D, and 7D which can, in turn, be used to identify the type of cartridge 110d that has been inserted into the receiver 104.

In accordance with the above-described embodiments of the present invention, the type of cartridge inserted into the drive can be identified before the cartridge 110 is lowered into the fully loaded position. This can enable the tape drive system 100 to utilize different loading processes for different cartridge types. For example, some types of cartridges may incorporate different types of tape leaders. By identifying the type of cartridge prior to completing the loading process, the appropriate tension for the particular cartridge type may be utilized during the buckler operation.

Figure 9A:
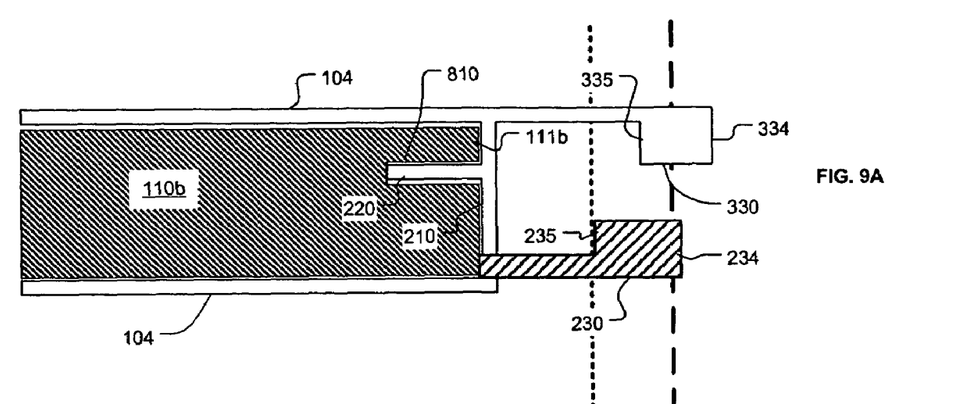
FIGS. 9A-9B are simplified block diagrams showing the operation of the tape drive system in accordance with other embodiments of the present invention.
Figure 9B:
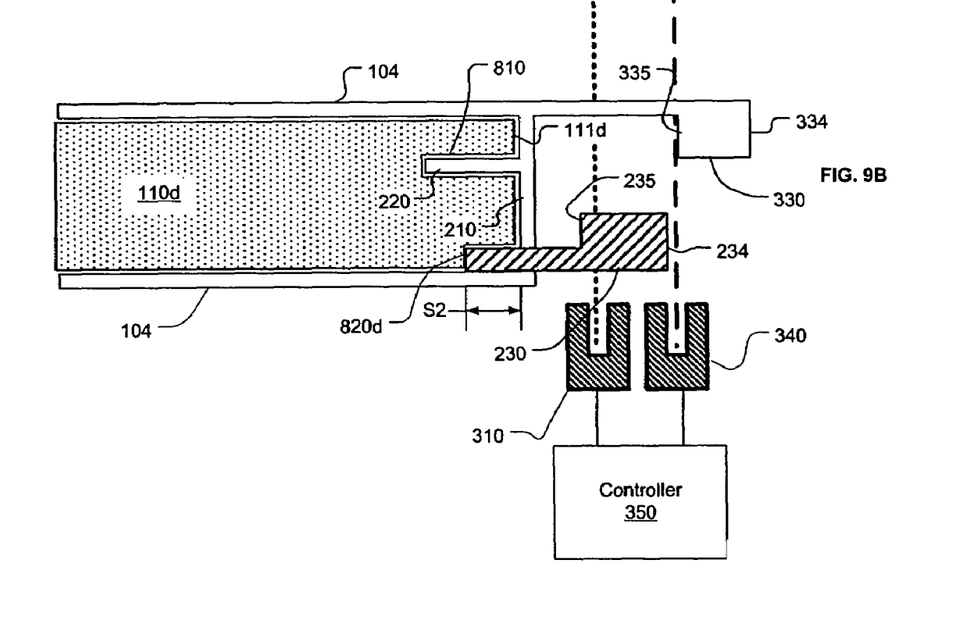

FIGS. 9A-9B are block diagrams illustrating a cartridge type determination method in accordance with other embodiments of the present invention. In this example, the tape drive system 100 is only configured to distinguish between two different types of acceptable cartridges. The first type of cartridge (shown in FIG. 9A as cartridge 110b) does not have an indicator slot 820 and the second type of cartridge (shown in FIG. 9B as cartridge 110d) has an indicator slot 820 having a depth S2. Here, the cartridge type determination process can be simplified because the controller 350 does not have to distinguish between cartridges having varying depths of indicator slots 820; the controller 350 only needs to determine whether the cartridge 110 has an indicator slot 820 or does not.

This process may begin when the cartridge 110 is inserted as far as possible into the receiver 104. When the receiver flag sensor 340 detects the presence of the receiver flag 330, the controller 350 knows that a cartridge load is being requested. As described above with respect to FIG. 4A, the controller 350 may be configured to make the initial determination as to whether the cartridge is a valid cartridge type by determining whether the media flag sensor 310 also detects the media flag 230. If not, then the controller 350 will conclude that an unacceptable cartridge type has been inserted. If both the media flag 230 is first detected and then the receiver flag 330 is detected, then the controller 350 will instruct the loading mechanism 120 to begin the loading process by translating the receiver 104 in the forward direction.

The flags 230, 330 and sensors 310, 340 may be arranged such that as the receiver 104 moves forward, either the media flag 230 will pass beyond the range of the media flag sensor 310 first (as shown in FIG. 9A) or the receiver flag 330 will pass beyond the range of the receiver flag sensor 340 first (as shown in FIG. 9B). In the event that the media flag sensor 310 ceases to detect the media flag 230 while the receiver flag sensor 340 continues to detect the receiver flag 330, the controller 350 will conclude that the cartridge 110b contained in the receiver 104 is of the first cartridge type lacking an indicator slot 820. In the event that the receiver flag sensor 340 ceases to detect the receiver flag 330 while the media flag sensor 310 continues to detect the media flag 230, the controller 350 will conclude that the cartridge 110d contained in the receiver 104 is of the second cartridge type having an indicator slot 820. In this case, the controller 350 does not need to monitor the distances of travel for the receiver 104 in order to make this determination. The loading mechanism 120 can then complete the loading process by translating the receiver 104 downward onto the reel driver.

If it is desired at a later point to enable the tape drive system 100 to distinguish between more than two different types of acceptable cartridges, the controller 350 may be updated to utilize the first embodiment described above. This updating can be done, for example, by updating the software or firmware for the controller 350, or by replacing the controller 350 in part or entirely. The remaining components of the tape drive system 100 such as the sensors 310, 340 and the flags 230, 330 may remain the same.

In accordance with other aspects of the present invention, the tape drive system 100 may be configured to determine whether a cartridge remains inside of the receiver 104 after the loading mechanism 120 has completed an unloading process. After the desired data has been read from and/or written to the tape media in the tape cartridge, the tape leader on the cartridge 110 may be decoupled from the take-up leader on the tape drive system 100. Then, the loading mechanism 120 may first raise the receiver 104 upwards off of the reel driver and then translate the receiver 104 in the rearward direction to position the cartridge 110 in a location where the cartridge 110 may be retrieved by the picker mechanism or by a human operator. In some cases, however, even after the receiver 104 has been translated to the unloaded position, the picker mechanism may not remove the cartridge 110 from the receiver 104. The presence of a cartridge 110 in the receiver 104 even after unloading can be determined by using the media flag sensor 310. As long as the media flag sensor 310 continues to detect the media flag 230, the drive controller 350 will recognize that the cartridge 110 remains in the receiver 104 without needing to communicate with the picker mechanism controller or with the human operator. In some cases, the controller 350 may re-initiate the loading process to reload the cartridge 110 without operator assistance if it is desired to read and/or write data to the tape medium.

While the invention has been described in terms of particular embodiments and illustrative figures, those of ordinary skill in the art will recognize that the invention is not limited to the embodiments or figures described. For example, the embodiments described above relate to the loading of a tape cartridge containing a single cartridge reel. It will be understood that in other embodiment, various types of storage media devices may be used, such as, for example, tape cassettes containing two reels.

In addition, in the embodiments described above, the distance the receiver 104 travels may be determined using a tachometer coupled to a motor driving the loading mechanism 120. In other embodiments, the distances D2-D4 can be determined using other methods. For example, the loading process may include translating the receiver 104 in the forward direction at a known rate. After the controller 350 receives a signal from the media flag sensor 310 indicating that the media flag 230 is no longer detected, the loading mechanism 120 will continue to translate the receiver 104 forward at the known rate until the trailing edge 335 of the receiver flag 330 passes beyond the receiver flag sensor 340. The controller 350 may be configured to monitor the elapsed time between the moment that the media flag 230 ceases to be detected and the moment that the receiver flag 330 ceases to be detected. By taking the known distance between the media flag sensor 310 and the receiver flag sensor 340 (shown as distance S in FIGS. 4A-4D) and subtracting the distance calculated by multiplying the elapsed time by the velocity rate of the receiver 104, the distance D2 can be determined. This distance D2 is the distance between the trailing edge 235 of the media flag 230 and the trailing edge of 335 of the receiver flag 330. The controller 350 can be programmed to correlate the distance D2 with the cartridge type of cartridge 110b, and thereby identify the type of cartridge that has been inserted into the receiver 104.

In addition, in the above-described embodiments, the presence of the brake release opening 810 is used to determine whether the inserted cartridge is of a valid type. In valid cartridges, the brake release pin 220 will be received into the cartridge, thereby allowing the cartridge to be fully inserted. In valid cartridge types, the brake release pin 220 will abut the front of the cartridge, preventing full insertion. In other embodiments, this mechanism for identifying incompatible cartridges may be different. For example, some other feature of the cartridge, such as a door opening mechanism or alignment slots, may be used to separate the compatible from the incompatible cartridges.

In the above-described embodiments, the trailing edges of the media flag 230 and the receiver flag 330 are used to determine the position of the media flag 230. This can enable the tape drive system 100 to use only two sensors (the media flag sensor 310 and the receiver flag sensor 340) to detect multiple conditions. For example, the receiver flag sensor 340 can be used to detect a load request, the media flag sensor 310 can be used to detect the presence or absence of a valid cartridge type, and then the two sensors 310, 340 can be used in conjunction to determine the cartridge type as described above. It will be understood that the invention need not be limited to the precise arrangement and positions of the various flanges, tongues, fingers, and sensors shown and described herein. In various embodiments, these features may be positioned and arranged differently. For example, the shape and arrangement of the media flag 230 and the receiver flag 330 may vary. Although FIGS. 4-7 show the receiver flag 330 being positioned forward of the media flag 230, in other embodiments, their positions may be different. The leading edge 334 of the receiver flag 330 may be located rearward of or parallel to the leading edge 234 of the media flag 230. The relative positions of these two flags 230, 330 for different cartridges can still be used to determine the type of cartridge inserted into the receiver 104. In addition, the controller 350 need not make the cartridge type determination by calculating the distance D2 between the trailing edges of the flags 230, 330. In other embodiments, the controller 350 can determine the relative positions of the media flag 230 and the receiver flag 330 using other datums.

The figures provided are merely representational and may not be drawn to scale. Certain proportions thereof may be exaggerated, while others may be minimized. The figures are intended to illustrate various implementations of the invention that can be understood and appropriately carried out by those of ordinary skill in the art.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed as new and desired to be protected by Letters Patent of the United States is:

1. A data drive, comprising:
    a drive base;
    a receiver for receiving a storage media device, the receiver being movably coupled to the drive base and translatable from an unloaded position to a loaded position;
    a media flag movably coupled to the receiver and translatable from a first position to a second position, such that, at any instant, all points of the media flag move at the same velocity and direction of motion as every other point of the media flag, in response to inserting the storage media device into the receiver, wherein the media flag comprises an insertion depth measure for identifying a media type;
    a media flag sensor fixedly coupled to the drive base for detecting movement of the media flag;
    a receiver flag fixedly coupled to the receiver, wherein the receiver flag comprises a distance measure for determining if the storage media device is in the loaded position; and
    a receiver flag sensor fixedly coupled to the drive base for detecting movement of the receiver flag.

2. The data drive of claim 1, further comprising:
    a read head for reading data from a tape contained in the storage media device.

3. The data drive of claim 1, wherein:
    the receiver receives a storage media device comprising a tape cartridge.

4. The data drive of claim 1, further comprising:
    a lock release member coupled to the receiver and positioned to release a reel lock of a compatible storage media device and to prevent full insertion of an incompatible storage media device.

5. The data drive of claim 1, further comprising:
    a drive controller coupled to the media flag sensor and the receiver flag sensor for receiving sensor signals from the media flag sensor and the receiver flag sensor.

6. The data drive of claim 5, wherein:
    the drive controller determines a storage media device type based on detection of the media flag and receiver flag.

7. The data drive of claim 6, wherein:
    the drive controller determines a storage media device type based on detection of the media flag and receiver flag by identifying the inserted storage media device as a first type of storage media device if the distance measure is detected before the insertion depth measure is detected and identifying the inserted storage media device as a second type of storage media device if the distance measure is detected after the insertion depth measure is detected.

8. The data drive of claim 6, wherein:
    the drive controller determines a storage media device type based on detection of the media flag and receiver flag by determining a distance between the insertion depth measure and the distance measure and identifying storage media device type corresponding to the distance between the insertion depth measure and the distance measure.

9. The data drive of claim 6, wherein:
    the drive controller determines a storage media device type based on detection of the media flag and receiver flag by detecting the insertion depth measure of the media flag using the media flag sensor and as the receiver travels from the unloaded position to the loaded position monitoring the distance of travel of the receiver between the detection of the insertion depth measure and a detection of the distance measure on the receiver flag by the receiver flag sensor.

* * * * *